United States Patent
Ahmadi (10) Patent No.: US 10,483,711 B2
(45) Date of Patent: Nov. 19, 2019

(54) METHOD AND APPARATUS FOR PROVIDING AMPLIFIED RADIATION

(71) Applicant: NUFERN, East Granby, CT (US)

(72) Inventor: Peyman Ahmadi, Manchester, CT (US)

(73) Assignee: Nufern, East Granby, CT (US)

( * ) Notice: Subject to any disclaimer, the term of this patent is extended or adjusted under 35 U.S.C. 154(b) by 33 days.

(21) Appl. No.: 15/555,802

(22) PCT Filed: Mar. 4, 2016

(86) PCT No.: PCT/US2016/020891
§ 371 (c)(1),
(2) Date: Sep. 5, 2017

(87) PCT Pub. No.: WO2016/141290
PCT Pub. Date: Sep. 9, 2016

(65) Prior Publication Data
US 2018/0069366 A1   Mar. 8, 2018

Related U.S. Application Data

(60) Provisional application No. 62/128,876, filed on Mar. 5, 2015.

(51) Int. Cl.
*H01S 3/30* (2006.01)
*H01S 3/067* (2006.01)
(Continued)

(52) U.S. Cl.
CPC ........ *H01S 3/06754* (2013.01); *G02F 1/0115* (2013.01); *H01S 3/06758* (2013.01);
(Continued)

(58) Field of Classification Search
CPC ............... H01S 3/06754; H01S 3/0941; H01S 3/06758; H01S 3/094003; H01S 3/10007;
(Continued)

(56) References Cited

U.S. PATENT DOCUMENTS

2005/0078358 A1   4/2005 Sato et al.
2005/0225839 A1   10/2005 Patel et al.
(Continued)

FOREIGN PATENT DOCUMENTS

EP   0 647 000   4/1995

OTHER PUBLICATIONS

International Search Report and Written Opinion in International Patent Application No. PCT/US2016/020891, dated Jun. 27, 2016.

*Primary Examiner* — Tod T Van Roy
*Assistant Examiner* — Delma R. Fordé
(74) *Attorney, Agent, or Firm* — McDonnell Boehnen Hulbert & Berghoff LLP (57) ABSTRACT

The present disclosure relates to methods and apparatuses for providing optical radiation having improved rise/fall times and improved levels of leakage. One method for amplifying optical radiation includes an intermediate stage (220) having an intermediate active optical fiber (222), the intermediate active optical fiber and a final amplifying stage (230) including a final active optical fiber (232), and providing optical radiation to the input of the intermediate active optical fiber, wherein one or more final optical pump sources (235) are together in a low power state such that the optical radiation is substantially absorbed by the intermediate active optical fiber and such that substantially no optical radiation of the amplified wavelength is transmitted by the intermediate stage. The intermediate active optical fiber (222) can then be switched to a transmissive state by switching the final optical pump source(s) (235) to a high power state. The input to the intermediate stage may comprise a seed laser (205) and plural first amplifier stages (210) having each a first active optical fiber (212). A filter (260) between the intermediate stage (220) and the final amplifying
(Continued)

ing stage (230) prevents ASE and pump light from the intermediate stage to reach the final amplifying stage.

23 Claims, 6 Drawing Sheets

(51) Int. Cl.
  *H01S 3/094* (2006.01)
  *H01S 3/10* (2006.01)
  *G02F 1/01* (2006.01)
  *H01S 3/0941* (2006.01)
  *H01S 3/00* (2006.01)

(52) U.S. Cl.
  CPC ...... *H01S 3/0941* (2013.01); *H01S 3/094003* (2013.01); *H01S 3/10007* (2013.01); *H01S 3/0078* (2013.01); *H01S 3/0675* (2013.01); *H01S 3/09415* (2013.01); *H01S 3/094061* (2013.01); *H01S 3/094076* (2013.01); *H01S 2301/02* (2013.01)

(58) Field of Classification Search
  CPC ............. H01S 3/0675; H01S 3/094076; H01S 3/094061; H01S 3/0078; H01S 3/09415; H01S 3/067; H01S 3/094; H01S 3/10; H01S 2301/02; G02F 1/0115; G02F 1/01
  See application file for complete search history.

(56) References Cited

U.S. PATENT DOCUMENTS

| | | | |
|---|---|---|---|
| 2006/0209392 A1* | 9/2006 | Caponi | H04B 10/294 359/337.4 |
| 2007/0263677 A1* | 11/2007 | Tanaka | H01S 3/117 372/17 |
| 2009/0141751 A1* | 6/2009 | Kakui | H01S 3/2308 372/25 |
| 2013/0107351 A1* | 5/2013 | Clowes | H01S 3/06758 359/341.3 |
| 2016/0254637 A1* | 9/2016 | Ikoma | H01S 3/06716 372/6 |
| 2016/0276800 A1* | 9/2016 | Clowes | H01S 3/0057 |
| 2017/0294757 A1* | 10/2017 | Rapp | H01S 3/06754 |

* cited by examiner

METHOD AND APPARATUS FOR PROVIDING AMPLIFIED RADIATION

CROSS-REFERENCE TO RELATED APPLICATIONS

This application is a U.S. national phase application of International Patent Application no. PCT/US2016/020891 filed Mar. 4, 2016, which claims the benefit of priority of U.S. Provisional Patent Application No. 62/128,876, filed Mar. 5, 2015, which is hereby incorporated herein by reference in its entirety.

BACKGROUND OF THE DISCLOSURE

1. Field of the Disclosure

The present disclosure relates generally to optical fiber lasers and amplifiers. The present disclosure relates more particularly to methods and systems for providing optical radiation having improved rise/fall times and improved levels of leakage power.

2. Technical Background

Optical fiber lasers and amplifiers are known in the art. In such lasers and amplifiers, rare earth materials disposed in the core of the optical fiber therein absorb pump radiation of a predetermined wavelength, and, in response thereto, generate or amplify light of a different wavelength for propagation in the core. For example, the well-known erbium doped fiber receives pump radiation having a wavelength of 980 or 1480 nm, and generates or amplifies optical radiation propagating in the core and having a wavelength of about 1550 nm. Lasers and amplifiers generally include one or more amplifier stages, each including a length of fiber that is coupled to one or more pump radiation sources (e.g., pump lasers) and configured to amplify optical radiation passing through its core.

Optical radiation can have a rise time, i.e., the time it takes to reach a threshold power from substantially no power, and a fall time, i.e., the time it takes to drop below a threshold power from a substantially high power. Fast rise and fall times are desirable in many real-world applications of optical fiber lasers and amplifiers. Conventional high-power laser systems include multiple amplification stages, arranged in series. An example of a conventional high-power laser system 100 is shown in schematic view in FIG. 1. The laser system includes three amplification stages (110, 130), arranged in series with optical fibers connecting the output of one amplification stage to the input of the next; a seed laser 105 is included to provide initial radiation to the first amplifier stage in the chain. Each amplification stage includes an active optical fiber (112, 132). One or more pump diodes (115, 135) are configured to pump the various active optical fibers of the amplifier stages. Typically, the bulk of the amplifier power is provided by the final amplifier stage. The pump diodes of each stage need to be switched on or off when the output state of the laser system is to be changed. The switching of the pump diodes of the various amplification stages need to be coordinated in order to turn the overall system into an on or off state. A controller configured to switch the pump diodes on and off in a coordinated fashion is indicated by reference numeral 140. But precisely coordinating the switching of the laser diodes of different amplification stages is difficult; such difficulties tend to limit the speed of rise and fall of the amplified radiation output by the system.

This problem is conventionally addressed using a "simmer mode" in which, during their "off" state, a simmer current less than the lasing threshold passes through the pump diodes. This can help to improve the overall rise/fall time of the system, but requires complicated algorithms to ensure coordinated switching of the different amplification stages to prevent potential damage caused by a lack of signal power. Moreover, these complicated algorithms are often insufficient to provide the desired rise/fall time to the system.

Another conventional manner in which this problem is addressed is to switch on and off only the final pump diode, leaving the pump diodes for the previous stages in a high power state. However, this can lead to an unacceptable level of leakage power for the overall system when it is in an "off" state.

Accordingly, there remains a need for improved optical amplifying systems and methods that can provide improved amplification rise/fall times.

SUMMARY OF THE DISCLOSURE

One aspect of the present disclosure is an optical fiber amplifying system, the optical fiber amplifying system providing amplified optical radiation having a first amplified wavelength, the optical fiber amplifying system comprising
  an optical source having an output, the optical source being configured to provide radiation of the first amplified wavelength;
  an intermediate stage having an input operatively coupled to the output of the optical source and an output, the intermediate stage comprising an intermediate active optical fiber having an amplified wavelength that is substantially the same as the first amplified wavelength and a first pump wavelength;
  a final amplifying stage having an input coupled to the output of the intermediate stage and an output, the final amplifying stage comprising a final active optical fiber, the final active optical fiber being configured to amplify radiation at the first amplified wavelength when pumped with pump radiation of the first pump wavelength; and
  one or more final optical pump sources together operatively coupled to the final active optical fiber and the intermediate active optical fiber and configured to output radiation of the first pump wavelength.

Another aspect of the disclosure is a method for amplifying optical radiation. The method includes providing an optical fiber amplifying system as described herein, then providing optical radiation having the first amplified wavelength from the optical source to the input of the intermediate active optical fiber, wherein the one or more final optical pump sources are together in a low power state such that the optical radiation is substantially absorbed by the intermediate active optical fiber and such that substantially no optical radiation of the amplified wavelength is transmitted by the output of the intermediate stage. The method can further include switching the one or more final optical pump sources from the low power state to a high power state, such that the optical radiation of the amplified wavelength is substantially transmitted by the intermediate active optical fiber and such that substantial optical radiation of the amplified wavelength is transmitted by the output of the intermediate stage Any of the features described herein in conjunction with any one aspect or embodiment described herein can be combined with features described with respect to any other of the aspects or embodiment described herein, as would be evident to the person of ordinary skill in the art in view of the present disclosure.

As the person of ordinary skill in the art will appreciate, the drawings are not necessarily drawn to scale, and various elements of the systems may in certain drawings be omitted for purposes of clarity.

DETAILED DESCRIPTION

Figure 2:
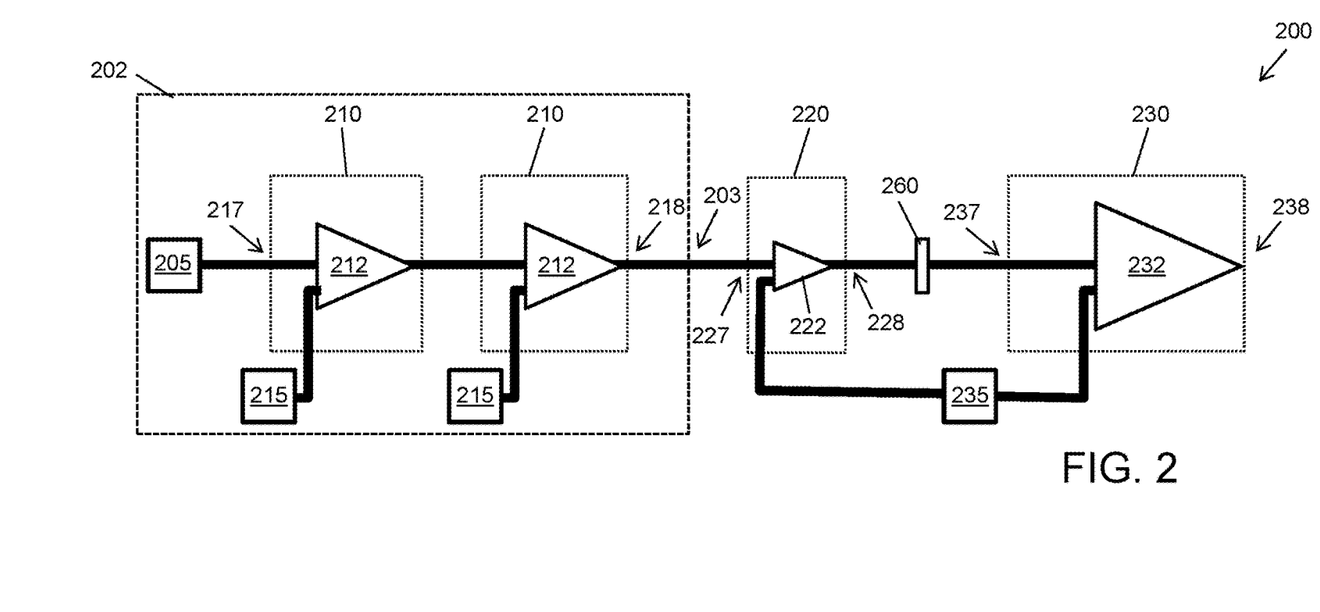
FIG. 2 is a schematic view of an optical fiber amplifying system according to one embodiment of the disclosure.

One embodiment of the disclosure is shown in schematic view in FIG. 2. Optical amplifying system 200 is configured as a multi-stage fiber laser. While the amplifying system 200 of FIG. 2 is configured with four active fiber stages, the person of ordinary skill in the art will appreciate that other numbers of stages could be used. Optical amplifying system 200 provides amplified optical radiation having a first amplified wavelength. As described in more detail below, the person of ordinary skill in the art can select combinations of pump wavelengths and active optical fibers to provide a variety of amplified wavelengths.

Optical fiber amplifying system 200 of FIG. 2 provides amplified optical radiation having a first amplified wavelength. It includes an optical source 202 having an output 203. The optical source 202 is configured to provide radiation of a first amplified wavelength. The system 200 further includes an intermediate stage 220. The intermediate stage 220 has an input 227 operatively coupled to the output 203 of the optical source 202 and an output 228, and includes an intermediate active optical fiber 222. As the person of ordinary skill in the art will appreciate, an active optical fiber is an optical fiber that can provide amplified radiation at an amplified wavelength upon being pumped with pump radiation of a suitable pump wavelength. The intermediate active optical fiber has an amplified wavelength that is substantially the same as the first amplified wavelength and a first pump wavelength. As the person of ordinary skill in the art will appreciate, the pump wavelength of an active optical fiber is a wavelength of radiation that will cause the active optical fiber to amplify radiation of an amplified wavelength. Here, the first pump wavelength is a wavelength that will cause the active optical fiber to amplify radiation of the first amplified wavelength.

The optical amplifying system also includes a final amplifying stage 230. The final amplifying stage 230 has an input 237 and an output 238, and includes a final active optical fiber 232. The final active optical fiber is configured to amplify radiation at the first amplified wavelength when pumped with pump radiation of the first pump wavelength. One or more final optical pump sources 235 are together operatively coupled to the final active optical fiber and the intermediate active optical fiber.

The optical source 202 can take many forms. In one embodiment, the optical source can be a seed optical source such as a seed laser or oscillator. In certain embodiments, the optical source includes one or more first amplifying stages together having an output, each of the one or more first amplifying stages comprising a first active optical fiber, the first active optical fiber being configured to amplify radiation at the first amplified wavelength when pumped with pump radiation of a second pump wavelength; and one or more first optical pump sources, each configured to output radiation of the second pump wavelength, each operatively coupled to one or more of the first active optical fibers of the first amplifying stages. In the embodiment of FIG. 2, the optical source 202 includes two initial amplifying stages 210. Together, the first amplifying stages have an input 217 and an output 218. Each of the first amplifying stages includes an active optical fiber 212. The active optical fiber(s) of the first amplifying stage(s) are configured to amplify radiation at the first amplified wavelength when pumped with pump radiation of a second pump wavelength. The second pump wavelength can be, for example, substantially identical to the first pump wavelength. Accordingly, the optical fiber amplifying system 200 also includes one or more first optical pump sources 215, each configured to output radiation of the second pump wavelength, and each operatively coupled to one or more of the first active optical fibers of the first amplifying stages. While the optical fiber amplifying system of FIG. 2 includes two first amplifying stages, the person of ordinary skill in the art will appreciate that any convenient number of first amplifying stages can be used. Moreover, in other embodiments, the optical source can simply be a fiber that carries radiation from a remote source.

An optical fiber amplifying system that includes one or more first amplifying stages can further include a seed optical source, such as a seed laser or oscillator, having an output optically coupled to the input of the one or more first amplifying stages. For example, optical fiber amplifying system 200 of FIG. 2 includes a seed laser 205 having an output optically coupled to the input 217 of the first amplifying stages 210. The seed laser or oscillator can provide seed radiation of the first amplified wavelength, as would be appreciated by the person of ordinary skill in the art. Of course, in other embodiments, no seed optical source is present; the first amplifying stages can generate radiation through the amplification of spontaneous emission in such cases, as would be apparent to the person of ordinary skill in the art.

Another aspect of the disclosure is a method for generating amplified radiation. The systems described herein can be used in various aspects to perform the methods described herein. In one embodiment, a method for amplifying optical radiation includes providing an optical fiber amplifying system that includes an optical source, an intermediate stage, a final amplifying stage and one or more final optical pump sources substantially as described herein. Optical radiation having the first amplified wavelength is provided to the input of the intermediate stage while the one or more final optical pump sources are together in a low power state, such that the optical radiation is substantially absorbed by the intermediate active optical fiber and such that substantially no optical radiation of the amplified wavelength is transmitted by the output of the intermediate stage. In certain embodiments, the method further includes switching the one or more final optical pump sources from the low power state to a high power state, such that the optical radiation is substantially transmitted by the intermediate active optical fiber and such that substantial optical radiation of the amplified wavelength is transmitted by the output of the intermediate stage.

The present inventors have determined that the active optical fiber of the intermediate stage can act, in essence, as an optical switch for optical radiation of the first amplified wavelength. When the one or more optical pump sources are in a low power state, the intermediate active optical fiber can be in a substantially non-inverted state (e.g., metallic dopant species are substantially in their ground state). As such, the intermediate active optical fiber will absorb radiation of the first amplified wavelength instead of amplifying it. The absorbed radiation of the first amplified wavelength will be converted to other forms of energy by the intermediate active optical fiber, for example, to heat, or to radiation of other wavelengths. For example, the absorbed radiation of the first amplified wavelength can be converted to amplified spontaneous emission having a wavelength greater than the first amplified wavelength. As the person of ordinary skill in the art will appreciate, the wavelength(s) of the amplified spontaneous emission will depend on the details of the intermediate active optical fiber and the first amplified wavelength. When the one or more final pump sources are in a high power state, however, they can put the intermediate active optical fiber in a substantially inverted state (e.g., with a substantial fraction of metallic dopant species in an excited state). As the person of ordinary skill in the art will appreciate, when the intermediate active optical fiber is in a substantially inverted state, it can be substantially transmissive to optical radiation of the first amplified wavelength.

Accordingly, by switching the one or more final optical pump sources between a low power state and a high power state, the intermediate stage can be switched between substantially non-transmissive (e.g., less than about 5%, less than about 1%, or even less than about 0.1% transmissive) and substantially transmissive (e.g., greater than about 80%, greater than about 90% or even greater than about 99%) to radiation of the first amplified wavelength. The one or more final optical pump sources can therefore alone be used to turn on and off the overall system output, for example, to carve out pulses of a desired fast rise time and/or fast fall time. As the intermediate stage can be switched to be substantially non-transmissive, it is not necessary to switch off any earlier stages. Accordingly, the optical source can remain at a high power state. For example, when the optical fiber amplifying system includes one or more first amplifying stages as described above, the one or more first optical pump sources can remain at a high power state, even while the overall system is not to be generating power. For example, the optical source can remain at substantially the same power throughout the process (i.e., while the one or more final optical pump sources are switched between low power and high power states), or at least at substantially high power throughout the process. Thus, when present, the seed source and/or the one or more first optical pump sources can, for example, remain at substantially same power throughout the process. The overall optical fiber amplifying system can thus have low leakage power, even though the optical source continues to provide radiation of the first amplified wavelength. Low power states and high power states for the final pump source(s) can be, for example, defined as a state providing sufficient power to provide a desired level of transmission to the intermediate stage. For example, a low power state can be a power sufficiently low to render the intermediate stage substantially non-transmissive (e.g., less than about 10%, less than about 5%, less than about 1%, or even less than about 0.1% transmissive) to radiation of the first amplified wavelength. This can be selected, for example, by providing an appropriate length of fiber to provide the desired attenuation in the low power state. Similarly, a high power state can be a power sufficiently high to render the intermediate stage substantially transmissive (e.g., greater than about 80%, greater than about 90%, greater than about 95%, or even greater than about 99%) to radiation of the first amplified wavelength.

In certain desirable embodiments, the methods described herein include allowing radiation of the amplified wavelength to be transmitted from the intermediate stage to the final stage, while substantially preventing amplified spontaneous emission from being transmitted from the intermediate stage to the final stage. Thus, any amplified spontaneous emission that is generated in the intermediate stage when the system is in an "off" state can be prevented from leaking through the system as leakage power.

Thus, in certain desirable embodiments, the optical amplifying system includes one or more optical filters operatively coupled between the intermediate stage and the final amplifying stage. In the system of FIG. 2, an optical filter is indicated by reference numeral 260. In certain embodiments, the one or more optical filters are configured to substantially pass radiation of the amplified wavelength from the intermediate stage to the final amplifying stage, and substantially prevent radiation of the pump wavelength from being transmitted from the intermediate stage to the final amplifying stage. In certain embodiments, the one or more optical filters are configured to substantially pass radiation of the amplified wavelength from the intermediate stage to the final amplifying stage, and substantially prevent radiation of the amplified spontaneous emission wavelength of the intermediate active optical fiber from being transmitted from the intermediate stage to the final amplifying stage. As the person of ordinary skill in the art will appreciate, the "amplified spontaneous emission wavelength" is the wavelength of emission of the intermediate active optical fiber resulting from absorption of radiation of the amplified wavelength. In certain embodiments, the one or more optical filters are configured to substantially pass radiation of the amplified wavelength from the intermediate stage to the final amplifying stage, and substantially prevent radiation of the amplified spontaneous emission wavelength of the intermediate active optical fiber and radiation of the pump wavelength from being transmitted from the intermediate stage to the final amplifying stage. The optical filters can be formed, for example, using fiber Bragg gratings, Fabry-Perot structures, dichroic elements or other structures known to the person of ordinary skill in the art.

In certain embodiments, the one or more optical filters operatively coupled between the intermediate stage and the final amplifying stage are configured to allow radiation of the amplified wavelength that is guided in an inner core of the fiber to pass to the final amplifying stage, but to absorb or scatter radiation that is unguided or guided in structures outside the inner core. The amplified spontaneous radiation generated by the intermediate stage is substantially unguided, or, at most, is substantially guided only in the pump cladding of an optical fiber. Thus, wavelength-based filtering of the amplified spontaneous emission is not necessary in many systems. For example, an optical filter sufficient to substantially prevent amplified spontaneous emission from being transmitted to the final stage can be configured as a section of optical fiber with a roughened cladding or an absorptive material disposed on the cladding, such that radiation that is unguided or guided in structures outside the inner core is absorbed or scattered out of the optical fiber. Such optical fibers are commonly used to remove pump radiation from active optical fibers. The optical fiber can be, for example, a dual-clad fiber.

In certain embodiments, a length of non-amplifying optical fiber connects the intermediate stage and the final amplifying stage. Substantially all of the amplified spontaneous emission will be coupled out from such an optical fiber, as it is not guided in the inner core thereof. Such an optical fiber can therefore act an optical filter sufficient to substantially prevent amplified spontaneous emission from being transmitted to the final stage. Here, too, the optical fiber can be a dual-clad fiber.

The person of ordinary skill in the art will appreciate that the optical amplifying systems described herein can be constructed using conventional techniques in the art. For example, various filters and monitors can be included in the system, and the system can be packaged as is typical for optical fiber amplifying systems. The various elements (e.g., the seed optical source, the one or more first amplifying stages, the various pump sources, the intermediate stage, and the final amplifying stage) can be interconnected, for example, using optical fibers through conventional techniques familiar to the person of ordinary skill in the art. In certain desirable embodiments, the optical path between the optical source and the one or more first amplifying stages, if present, is less than about 100 m, or even less than about 20 m, or even less than about 5 m. Similarly, in certain desirable embodiments, the optical path between the one or more first amplifying stages, if present, and the intermediate stage is less than about 100 m, or even less than about 20 m. In certain desirable embodiments, the optical path between the intermediate stage and the final amplifying stage is less than about 100 m, or even less than about 20 m, or even less than about 5 m.

Figure 3:
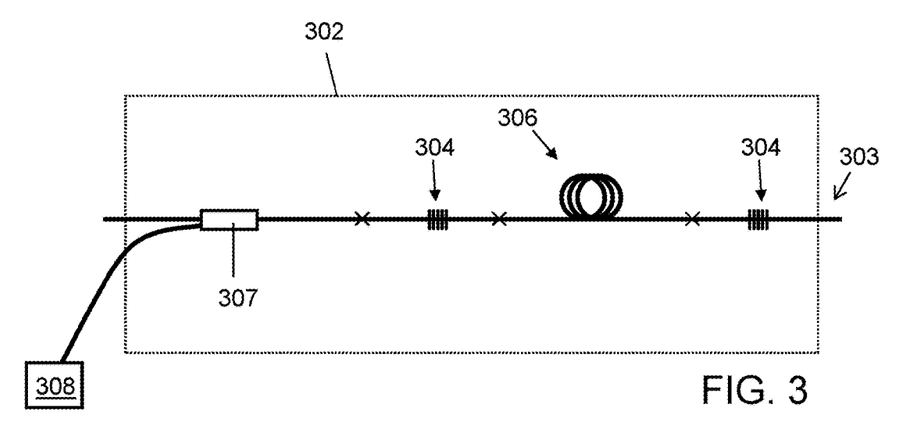
FIG. 3 is a partial schematic view of a laser cavity optical source useful in certain aspects of the disclosure.

The one or more first amplifying stages, the intermediate stage and the final amplifying stage can be provided in a variety of architectures, and arranged in a variety of ways, as would be apparent to the person of ordinary skill in the art. For example, the optical source can be configured as a laser cavity, with the active optical fiber disposed between two partially reflective optical elements and coupled to the respective pump source. For example, a partial schematic view of a laser cavity optical source is provided as FIG. 3. Laser cavity optical source 302 has an output 303, and includes an amplifying optical fiber 306 disposed between partially reflective elements 304 (here, fiber Bragg gratings). A pump coupler 307 couples an optical pump source 308 to the amplifying optical fiber. In the embodiment of FIG. 3, the pump source is arranged in the so-called "co-pumping" configuration, in which the pump radiation is transmitted through the amplifying optical fiber in the same direction as the input radiation. Of course, the person of ordinary skill in the art will appreciate that the counter-pumping configuration (i.e., with the pump source coupled to the output end of the amplifying optical fiber, such that the pump radiation propagates in the direction opposite the input-output direction of the stage) can be used. In other embodiments, both co- and counter-pumping can be provided, and more than one pump source can be provided regardless of the pumping scheme.

Figure 4:
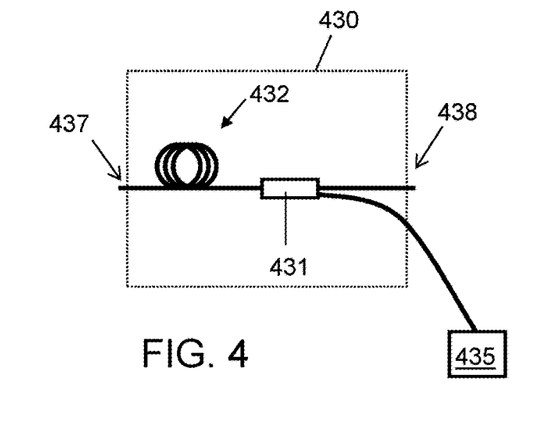
FIG. 4 is a partial schematic view of an amplifying stage useful in various aspects of the disclosure.

Additionally or alternatively, a first amplifying stage, the intermediate stage, and/or the final amplifying stage can be configured as an amplifier stage, in which there is no laser cavity formed. One example is shown in partial schematic view in FIG. 4. Here, final amplifying stage 430 has an input 437 and an output 438, with a final amplifying optical fiber 432 extending therebetween. Pump coupler 431 couples final optical pump source 435 to the output end of the amplifying optical fiber (i.e., in the counter-pumping configuration). Here, too, the amplifier stage can alternatively be configured in the co-pumping configuration or the co-/counter-pumping configuration. One or more of the first amplifying stages and/or the intermediate stage can also be configured as an amplifier.

Figure 1:
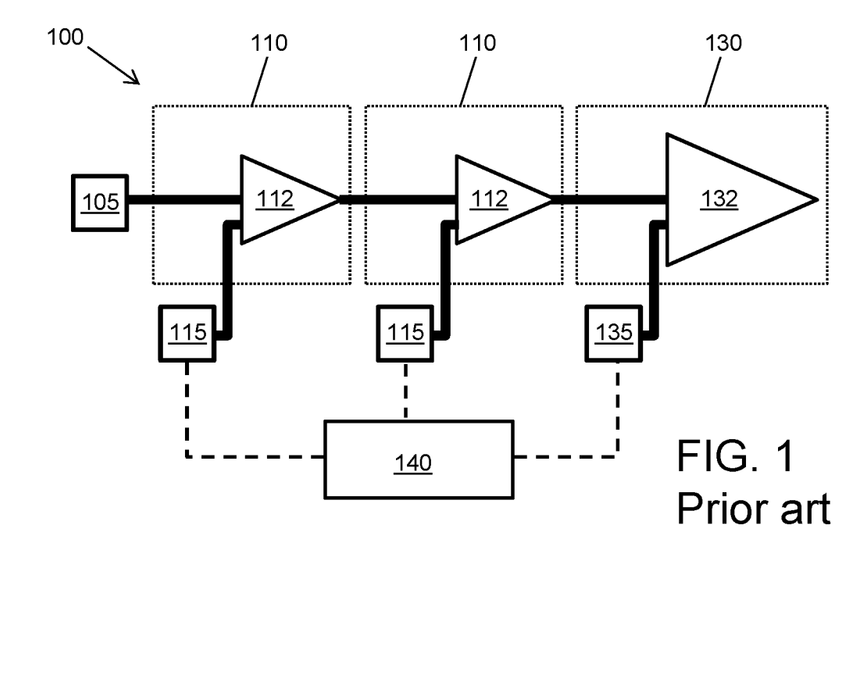
FIG. 1 is a schematic view of a conventional optical laser system.
Figure 5:
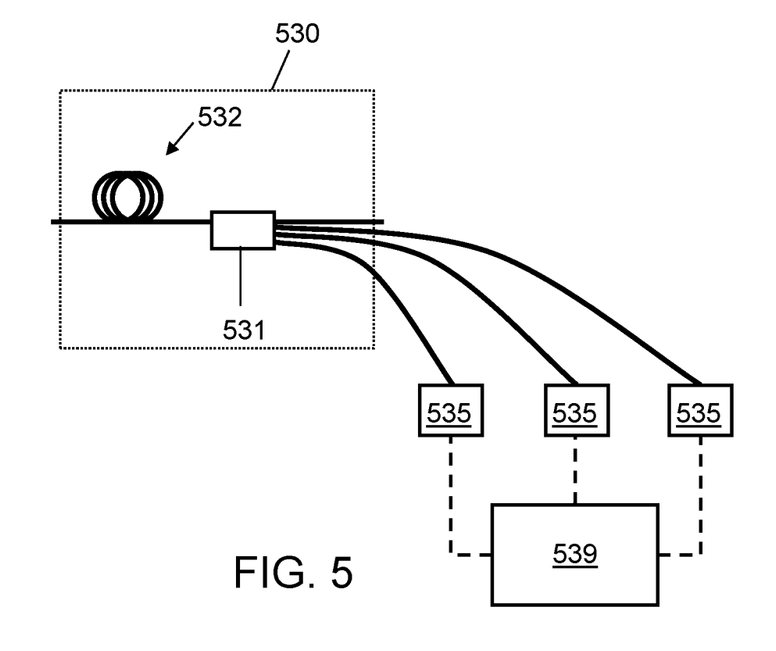
FIG. 5 is a schematic view of a final amplifying stage according to certain aspects of the disclosure.

As shown in FIG. 1, the one or more final pump sources are configured to provide pump radiation not only to the final amplifying stage, but also to the intermediate stage. In certain embodiments, a plurality of final pump sources are configured to be driven by a common voltage source (i.e., controlled by a common switch to switch between low- and high power states). This can simplify the control scheme, because driving multiple pumps with a common, singly-switched voltage source can automatically synchronize the pulses from the pumps. For example, FIG. 5 is a schematic view of a final amplifying stage 530 in which there are three pump sources 535, all driven by a common voltage source 539. The three pump sources are coupled together to the final amplifying optical fiber 532 at coupler 531. Of course, in other embodiments, the outputs of the three pump sources 535 are combined before being coupled to the final amplifying optical fiber 532.

Figure 6:
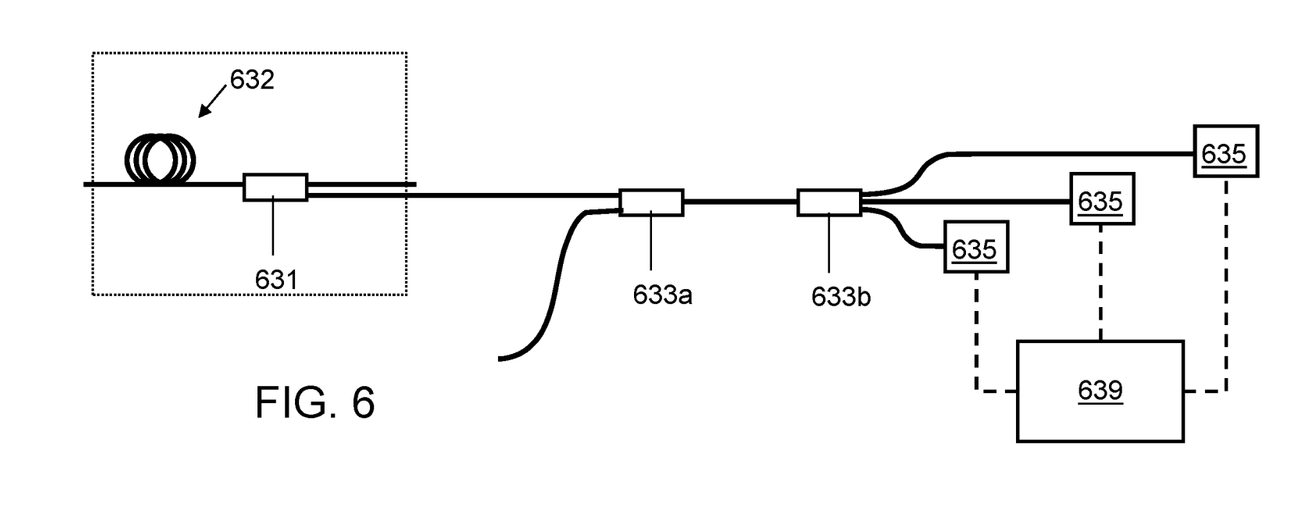
FIG. 6 is a partial schematic view of an optical fiber amplifying system according to one embodiment of the disclosure.

The output from the one or more final pump sources can be split in an appropriate ratio between the intermediate stage and the final amplifying stage. The ratio of power coupled between the intermediate stage and the final amplifying stage can vary, as would be apparent to the person of ordinary skill in the art in view of the present disclosure. For example, the intermediate stage/final amplifying stage ratio can be in the range of about 1:50 to about 2:1, or about 1:20 to about 1:1. The power can be split in a variety of ways familiar to the person of ordinary skill in the art, for example, using optical fiber couplers. For example, the output of each final pump source can be split first, and the individual fibers for the final amplifying stage and for the intermediate stage can then be separately combined. This configuration is shown in partial view in FIG. 5. Alternatively, the power from a plurality of final pump sources can first be combined, then split into the desired ratio, as shown in partial schematic view in FIG. 6. In FIG. 6, the outputs of the three final pump sources 635 (driven together by voltage source 639) are combined with combiner 633a, then split with splitter 633b, with one output going to coupler 631 to be coupled to final amplifying optical fiber 632, and with the other output going to the amplifier stage.

The amount of power from the one or more final pump sources is coupled into the intermediate stages can vary depending on the overall system design. Critically, the system should be configured so that the amount of power couplable into the intermediate stage from the one or more final pump sources is sufficient to render the intermediate stage transmissive to radiation of the amplified wavelength. For example, in certain embodiments, in the range of 100 mW to 4 W of pump power is transmitted to the intermediate stage, and in the range of 6 W to 30 W of pump power is transmitted to the final amplifying stage. In certain embodiments, the amount of power coupled from the one or more final pump sources to the intermediate stage is sufficient to not only render the intermediate stage transmissive to radiation of the amplified wavelength, but also to provide additional gain at the amplified wavelength. In such cases, the intermediate stage can be considered to itself be an additional amplifying stage, and can be pumped with, for example, in the range of 6 W to 30 W of pump power.

The length of the intermediate active optical fiber will vary depending on a variety of parameters, such as the power of the optical source, the particular identity of the dopant metal(s), and the first amplified wavelength. In certain embodiments, the intermediate active optical fiber is sufficiently long to be substantially non-transmissive (e.g., less than 10% transmissive, less than 5% transmissive, less than 1% transmissive, less than 0.1% transmissive) to radiation of the first amplified wavelength at a power of 0.1 W, 0.5 W, 1 W or 5 W.

Regardless of whether a particular stage is a laser cavity stage or an amplifier stage, the person of ordinary skill in the art will configure the stage to provide the desired device characteristics. Moreover, the person of ordinary skill in the art will appreciate that more complex architectures can be used in the various stages, including Q-switched and/or mode locked architectures. Moreover, the various stages in a given system can be arranged in a variety of ways, as the person of ordinary skill in the art will appreciate. For example, the person of ordinary skill in the art will appreciate that the so-called MOFA (master oscillator-fiber amplifier) architecture can be used in practicing the methods and systems as described herein. In the MOFA architecture, the output of a laser source (i.e., a "master oscillator") is amplified by one or more amplifying stages (i.e., the "fiber amplifiers") to provide high power output. As the person of ordinary skill in the art will recognize, the MOFA architecture can be advantaged in several ways. For example, lower power lasers are easier to control than higher power lasers with respect to properties such as linewidth, laser noise, wavelength tenability and pulse generation. Moreover, the higher-power components of the system are configured as amplifiers, and thus do not themselves include laser cavities. The amplifying optical fibers of the amplifying stages need only be able to withstand powers about equal to their output powers (as compared to the much higher intracavity power in a laser cavity configuration). In certain embodiments, e.g., when a relatively low-power seed laser or oscillator is used, the system can include a plurality of amplifier stages, for example, with increasing mode areas and pump powers along the chain. Thus, in one particular configuration of the embodiment of FIG. 2, each of the first amplifying stages, the intermediate stage and the final amplifying stage are configured as amplifiers (i.e., without a laser cavity formed within them). In certain embodiments, the various amplifying stages can have increasing mode areas and/or pump powers in order of position from the seed optical source.

The amplifying systems described herein can be configured to provide relatively high powers with low leakage power and fast rise/fall times. For example, in certain embodiments, an optical fiber amplifying system as described herein is configured to output at least 50 W, at least 500 W or even at least 5 kW of optical power. For such systems, the leakage power can be, for example, less than about 1 W, less than 500 mW, less than about 250 mW, or even less than 100 mW (e.g., in the range of 5 mW-1 W, or 5 mW-500 mW, or 5 mW-250 mW, or 5 mW-100 mW, or 10 mW-1 W, or 10 mW-500 mW, or 10 mW-250 mW, or 10 mW-100 mW, at the first amplified wavelength. The rise time can be, for example, less than 200 μs, less than 175 μs, or even less than 150 m μs (e.g., in the range of 50 μs-200 μs, or 50 μs-175 μs, or 50 μs-150 μs, or 100 μs-200 μs, or 100 μs-175 μs, or 100 μs-150 μs.

As noted above, an active optical fiber is an optical fiber that can provide amplified radiation at an amplified wavelength upon being pumped with pump radiation of a suitable pump wavelength. As the person of ordinary skill in the art will appreciate, in the systems described herein the active optical fiber is doped with metallic species (e.g., in ionic or oxide form) that provide the active character to the fiber; the particular amplified wavelengths and pump wavelengths for the system can depend chiefly on the particular metallic species present. For example, rare earth atoms such as neodymium, ytterbium, erbium, thulium, praseodymium or holmium can be used. For example, ytterbium can be pumped at wavelengths such as 910 nm, 940 nm and/or 975 nm to provide amplified radiation in the 1000-1150 nm wavelength range. Similarly, erbium can be pumped at wavelengths such as 980 nm and/or 1450 nm to provide amplified radiation in the 1500-1650 nm wavelength range. Neodymium can be pumped at wavelengths such as 808 nm to provide amplified radiation in the 1000-1150 nm wavelength range. Thulium can be pumped at wavelengths such as 793 nm, 1180 nm or 1550 nm to provide amplified radiation in the 1800-2200 nm wavelength range. Holmium can be pumped at wavelengths such as 1950 nm to provide amplified radiation in the 2100-2200 nm range. Of course, the person of ordinary skill in the art will appreciate that different pumping and amplified wavelengths may be achieved with these or different metallic species. In certain embodiments, the active optical fiber is doped with a plurality of different metallic species, e.g., with a combination of ytterbium and erbium as is conventional in the art.

The person of ordinary skill in the art will appreciate that standard optical fiber materials and constructions can be used in the active optical fibers for use in the systems and method described herein. For example, the optical fibers can be made from silica-based materials such as substantially undoped silica or silica doped with one or more materials. Suitable dopants can include, for example, phosphorus, germanium, fluorine, boron and aluminum, depending on the application. Doping can be used, for example, to provide desired mechanical or thermal properties to the base glass material, or to provide a desired refractive index to the base glass material. The person of ordinary skill in the art can select appropriate combinations of dopants to give desired refractive indices together with the desired softening points to allow for efficient drawing of the optical fibers with maintenance of the desired cross-sectional profile, as is conventional in the art. Base glass material including a rare earth can optionally be doped with one or more other materials, for example, to provide desired mechanical or thermal properties to the base glass material, to provide a desired refractive index to the base glass material, or to provide a desirable environment for the rare earth (e.g., to reduce clustering). Rare earth doped glass compositions are well known in the art, and such compositions can be used or modified by the person of ordinary skill in the art for use in the optical fibers and optical fiber devices of the present disclosure. The optical fibers can be provided with a variety of mode field areas and cladding configurations; for example, large-mode area active optical fibers and/or double-clad active optical fibers can be used by the person of ordinary skill in the art in the systems and methods described herein.

Figure 7:
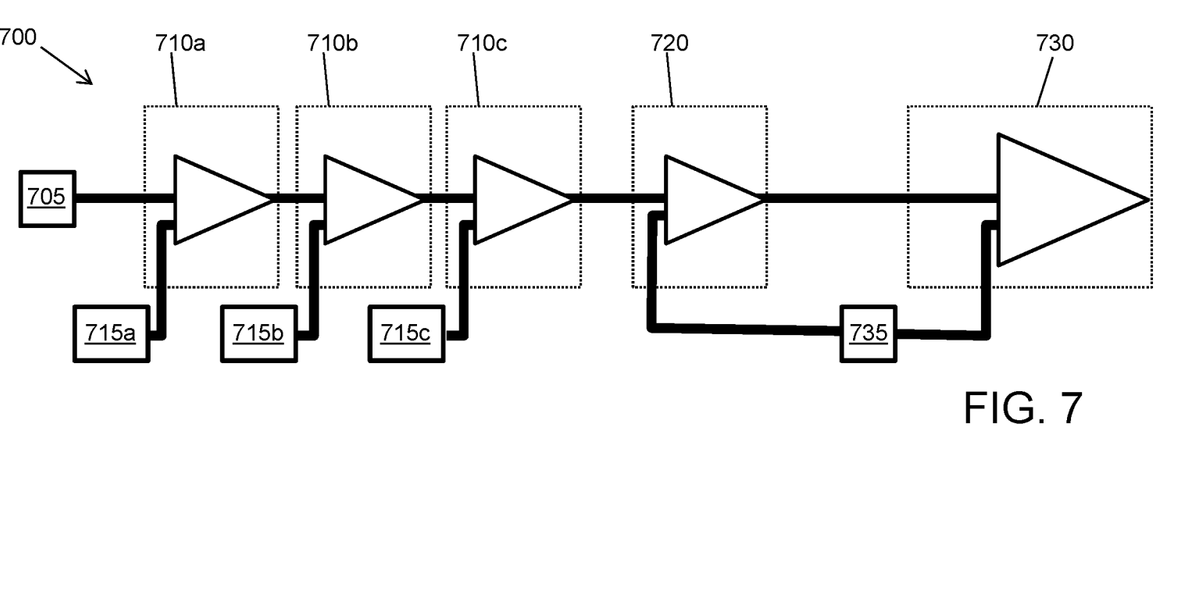
FIG. 7 is a schematic view of an optical fiber amplifying system according to another embodiment of the disclosure.

The present inventors have demonstrated that the systems and methods described herein can result in low leakage powers. An optical fiber laser system 700 was constructed as shown in FIG. 7. A 250 μW solid state 1064 narrow-linewidth wavelength stabilized laser was used as the seed laser 705. Pulse widths as short as 500 ps at repetition rates of several MHz were achieved through modulating the current through the seed laser. The device also includes five amplifying stages: three first amplifying stages 710a, 710b and 710c, respectively pumped by pump diode sources 715a, 715b and 715c; intermediate stage 720; and final amplifying stage 730, the intermediate stage and the final amplifying stage being pumped by a final pump diode sources 735 (in this case, six pump diodes). The seed laser's average power of 250 μW is amplified to 300 mW through the first amplifying stages 710a, 710b and 710c amplification stages. This light passes through 7 meters of active fiber in intermediate stage 720, then is boosted to an output power of 30 W in final amplifying stage 730. The output of the final pump diodes was split in a 30:70 ratio. The 30% pump leg is coupled to the intermediate stage in order to not only make it substantially transparent but also provide signal gain such that when the final pump diodes are turned on the output power of the intermediate stage rises to about 1 W. The 70% pump leg is coupled to the final amplifying stage. When these pump diodes are off the signal from the first amplifying stages is absorbed in the intermediate active fiber such that the leakage power coming out of the laser is reduced to about 25 mW. This leakage power can be further reduced by applying an asynchronous spontaneous emission filter at the output of the intermediate stage. However, since in many applications a 25 mW leakage power does not create any practical problem, it is not necessary to include a filter.

The terms "light", "radiation" and "optical", as used herein, are used broadly as understood by one of ordinary skill in the art of optical waveguides, and are not to be limited as pertaining only to the visible range of wavelengths.

In the claims as well as in the specification above all transitional phrases such as "comprising", "including", "carrying", "having", "containing", "involving" and the like are understood to be open-ended. Only the transitional phrases "consisting of" and "consisting essentially of" shall be closed or semi-closed transitional phrases, respectively.

It is understood that the use of the term "a", "an" or "one" herein, including in the appended claims, is open-ended and means "at least one" or "one or more", unless expressly defined otherwise. The occasional use of the terms herein "at least one" or "one or more" to improve clarity and to remind of the open nature of "one" or similar terms shall not be taken to imply that the use of the terms "a", "an" or "one" alone in other instances herein is closed and hence limited to the singular. Similarly, the use of "a part of", "at least a part of" or similar phrases (e.g., "at least a portion of") shall not be taken to mean that the absence of such a phrase elsewhere is somehow limiting.

For example, consider that it is disclosed that an optical fiber is initially etched along a length and then part or all of the etched length is bonded to a substrate. The phrase "said optical fiber including a length that is etched to have a reduced diameter, at least a part of said etched length bonded to said substrate", makes it clear that not all of the etched length need be bonded to the substrate. However, the phrase "an optical fiber having an etched length, said etched length being bonded to said substrate", also is not intended to require that all of the initially etched length be bonded to the substrate, regardless whether or not "at least a part of" is used in similar recitations elsewhere in the specification or claims or not.

Subsequent reference to the phrase "at least one", such as in the phrase "said at least one", to specify, for example, an attribute of the limitation to which "at least one" initially referred is not to be interpreted as requiring that the specification must apply to each and every instance of the limitation, should more than one be under consideration in determining whether the claim reads on an article, composition, machine or process, unless it is specifically recited in the claim that the further specification so applies.

The use of "or", as in "A or B", shall not be read as an "exclusive or" logic relationship that excludes from its purview the combination of A and B. Rather, "or" is intended to be open, and include all permutations, including, for example A without B; B without A; and A and B together, and as any other open recitation, does not exclude other features in addition to A and B.

It will be apparent to those skilled in the art that various modifications and variations can be made to the methods and systems of the present disclosure without departing from the scope thereof. Thus, it is intended that the present disclosure cover such modifications and variations provided they come within the scope of the appended claims and their equivalents.

What is claimed is:

1. An optical fiber amplifying system, the optical fiber amplifying system providing amplified optical radiation having a first amplified wavelength, the optical fiber amplifying system comprising one or more first amplifying stages together having an output, each of the one or more first amplifying stages comprising a first active optical fiber, the first active optical fiber being configured to amplify radiation at the first amplified wavelength when pumped with pump radiation of a first amplifying stage pump wavelength; and one or more first optical pump sources, each configured to output radiation of the first amplifying stage pump wavelength, each operatively coupled to one or more of the first active optical fibers of the first amplifying stages;

an intermediate stage having an input operatively coupled to the output of the one or more first amplifying stages and an output, the intermediate stage comprising an intermediate active optical fiber having an intermediate stage amplified wavelength and an intermediate stage pump wavelength, the intermediate stage amplified wavelength being substantially the same as the first amplified wavelength;

a final amplifying stage having an input coupled to the output of the intermediate stage and an output, the final amplifying stage comprising a final active optical fiber, the final active optical fiber being configured to amplify radiation at the first amplified wavelength when pumped with pump radiation of the intermediate stage pump wavelength; and one or more final optical pump sources together operatively coupled to the final active optical fiber and the intermediate active optical fiber and configured to output radiation of the intermediate stage pump wavelength, the one or more final optical pump sources being configured to be driven by a common voltage source, the one or more final optical pump sources being configured to be switched together, separately from the one or more first optical pump sources, between a low power state sufficient to render the intermediate active optical fiber substantially non-transmissive to radiation of the first amplified wavelength, and a high power state sufficient to render the intermediate active optical fiber substantially transmissive to radiation of the first amplified wavelength, while maintaining the one or more first optical pump sources are in a high power state.

2. The optical fiber amplifying system according to claim 1, further comprising a seed optical source having an output optically coupled to the input of the one or more first amplifying stages.

3. The optical fiber amplifying system according to claim 1, further comprising one or more optical filters operatively coupled between the intermediate stage and the final amplifying stage, the one or more optical filters being configured to substantially pass radiation of the intermediate stage amplified wavelength from the intermediate stage to the final amplifying stage, and substantially prevent radiation of the first amplifying stage pump wavelength from being transmitted from the intermediate stage to the final amplifying stage.

4. The optical fiber amplifying system according to claim 1, further comprising one or more optical filters operatively coupled between the intermediate stage and the final amplifying stage, the one or more optical filters being configured to substantially pass radiation of the intermediate stage amplified wavelength from the intermediate stage to the final amplifying stage, and substantially prevent radiation of an amplified spontaneous emission wavelength of the intermediate active optical fiber from being transmitted from the intermediate stage to the final amplifying stage.

5. The optical fiber amplifying system according to claim 1, further comprising one or more optical filters operatively coupled between the intermediate stage and the final amplifying stage, the one or more optical filters being configured to substantially pass radiation of the intermediate stage amplified wavelength from the intermediate stage to the final amplifying stage, and substantially prevent radiation of an amplified spontaneous emission wavelength of the intermediate active optical fiber and radiation of the first amplifying stage pump wavelength from being transmitted from the intermediate stage to the final amplifying stage.

6. The optical fiber amplifying system according to claim 5, wherein the one or more optical filters operatively coupled between the intermediate stage and the final amplifying stage are configured to allow radiation of the intermediate stage amplified wavelength that is guided in an inner core of the intermediate active optical fiber to pass to the final amplifying stage, but to absorb or scatter radiation that is unguided or guided in structures outside the inner core of the intermediate active optical fiber.

7. The optical fiber amplifying system according to claim 1, wherein the ratio of power coupled between the intermediate stage and the final amplifying stage is in the range of 1:20 to 1:2.

8. The optical fiber amplifying system according to claim 1, wherein the optical path between the one or more first amplifying stages and the intermediate stage is less than about 20 m, and the optical path between the intermediate stage and the final amplifying stage is less than about 20 m.

9. The optical fiber amplifying system according to claim 1, configured to output at least 500 W of optical power.

10. A method for amplifying optical radiation, the method comprising
providing an optical fiber amplifying system
one or more first amplifying stages together having an output, each of the one or more first amplifying stages comprising a first active optical fiber, the first active optical fiber being configured to amplify radiation at the first amplified wavelength when pumped with pump radiation of a first amplifying stage pump wavelength; and
one or more first optical pump sources, each configured to output radiation of the first amplifying stage pump wavelength, each operatively coupled to one or more of the first active optical fibers of the first amplifying stages;
an intermediate stage having an input operatively coupled to the output of the one or more first amplifying stages and an output, the intermediate stage comprising an intermediate active optical fiber having an intermediate stage amplified wavelength and an intermediate stage pump wavelength, the intermediate stage amplified wavelength being substantially the same as the first amplified wavelength;
a final amplifying stage having an input coupled to the output of the intermediate stage and an output, the final amplifying stage comprising a final active optical fiber, the final active optical fiber being configured to amplify radiation at the first amplified wavelength when pumped with pump radiation of the intermediate stage pump wavelength; and
one or more final optical pump sources together operatively coupled to the final active optical fiber and the intermediate active optical fiber and configured to output radiation of the intermediate stage pump wavelength, the one or more final optical pump sources being configured to be switched together, separately from the one or more first optical pump sources, between a low power state sufficient to render the intermediate active optical fiber substantially non-transmissive to radiation of the first amplified wavelength, and a high power state sufficient to render the intermediate active optical fiber substantially transmissive to radiation of the first amplified wavelength, while maintaining the one or more first optical pump sources are in a high power state; and
providing optical radiation having the first amplified wavelength from the one or more first amplifying stages to the input of the intermediate active optical fiber, while the one or more final optical pump sources are together in a low power state such that the optical radiation is substantially absorbed by the intermediate active optical fiber and such that substantially no optical radiation of the first amplified wavelength is transmitted by the output of the intermediate stage and substantially no optical radiation of the first amplified wavelength is outputted by the output of the final amplifying stage; and then
while continuing to provide optical radiation having the first amplified wavelength from the one or more first amplifying stages, switching the one or more final optical pump sources from the low power state to the high power state, such that the optical radiation of the first amplified wavelength is substantially transmitted by the intermediate active optical fiber and such that substantial optical radiation of the first amplified wavelength is transmitted by the output of the intermediate stage, and such that the output of the final amplifying stage outputs substantial optical power at the first amplified wavelength.

11. The method of claim 10, wherein, while the one or more final optical pump sources are together in a low power state, the one or more first optical pump sources are in a high power state, and wherein the one or more first amplifying stages are outputting substantial optical radiation at the first amplified wavelength.

12. The method of claim 10, wherein the one or more first optical pump sources remain at substantially the same power while the one or more final optical pump sources are together in a low power state and while the one or more final optical pump sources are together in a high power state.

13. The method of claim 10, wherein, the optical fiber amplifying system further comprises a seed optical source having an output optically coupled to the input of the one or more first amplifying stages, and while the one or more final optical pump sources are together in a low power state, the seed source is in a high power state, and wherein the seed source outputs substantial optical radiation at the first amplified wavelength.

14. The method of claim 13, wherein the seed optical source remains at substantially the same power while the one or more final optical pump sources are together in a low power state and while the one or more final optical pump sources are together in a high power state.

15. The method according to claim 10, wherein the method further comprises allowing radiation of the first amplified wavelength to be transmitted from the intermediate stage to the final stage, while substantially preventing radiation of the amplified spontaneous emission wavelength from being transmitted from the intermediate stage to the final stage.

16. The method of claim 10, wherein the switching the one or more final optical pump sources from the low power state to a high power state comprises pulsing the one or more final optical pump sources between the low power state and the high power state.

17. The method according to claim 10, wherein when the one or more final optical pump sources are in the high power state, the output of the final amplifying stage outputs at least 500 W of optical power at the first amplified wavelength.

18. The method according to claim 10, further comprising, after switching the one or more final optical pump sources from the low power state to a high power state, while continuing to provide optical radiation having the first amplified wavelength from the one or more first amplifying stages, switching the one or more final optical pump sources from the high power state to the low power state, such that low power state such that the optical radiation is substantially absorbed by the intermediate active optical fiber and such that substantially no optical radiation of the first amplified wavelength is transmitted by the output of the intermediate stage and substantially no optical radiation of the first amplified wavelength is outputted by the output of the final amplifying stage.

19. A method for amplifying optical radiation, the method comprising
    providing an optical fiber amplifying system, the optical fiber amplifying system providing amplified optical radiation having a first amplified wavelength, the optical fiber amplifying system comprising
    an optical source having an output, the optical source being configured to provide radiation of the first amplified wavelength;
    an intermediate stage having an input operatively coupled to the output of the optical source and an output, the intermediate stage comprising an intermediate active optical fiber having an intermediate stage amplified wavelength and an intermediate stage pump wavelength, the intermediate stage amplified wavelength being substantially the same as the first amplified wavelength;
    a final amplifying stage having an input coupled to the output of the intermediate stage and an output, the final amplifying stage comprising a final active optical fiber, the final active optical fiber being configured to amplify radiation at the first amplified wavelength when pumped with pump radiation of the intermediate stage pump wavelength; and
    one or more final optical pump sources together operatively coupled to the final active optical fiber and the intermediate active optical fiber and configured to output radiation of the intermediate stage pump wavelength; and
    providing optical radiation having the first amplified wavelength from the optical source to the input of the intermediate active optical fiber, wherein the one or more final optical pump sources are together in a low power state such that the optical radiation is substantially absorbed by the intermediate active optical fiber and such that substantially no optical radiation of the first amplified wavelength is transmitted by the output of the intermediate stage; and then
    while continuing to provide optical radiation having the first amplified wavelength from the optical source, switching the one or more final optical pump sources from the low power state to a high power state, such that the optical radiation of the first amplified wavelength is substantially transmitted by the intermediate active optical fiber and such that substantial optical radiation of the first amplified wavelength is transmitted by the output of the intermediate stage, and such that the output of the final amplifying stage outputs substantial optical power at the first amplified wavelength.

20. The method of claim 19, wherein, while the one or more final optical pump sources are together in a low power state, the one or more first optical pump sources are in a high power state, and wherein the one or more first amplifying stages are outputting substantial optical radiation at the first amplified wavelength.

21. The method of claim 20, wherein the one or more first optical pump sources remain at substantially the same power while the one or more final optical pump sources are together in a low power state and while the one or more final optical pump sources are together in a high power state.

22. The method according to claim 19, further comprising, after switching the one or more final optical pump sources from the low power state to a high power state, while continuing to provide optical radiation having the first amplified wavelength from the optical source, switching the one or more final optical pump sources from the high power state to the low power state, such that low power state such that the optical radiation is substantially absorbed by the intermediate active optical fiber and such that substantially no optical radiation of the first amplified wavelength is transmitted by the output of the intermediate stage and substantially no optical radiation of the first amplified wavelength is outputted by the output of the final amplifying stage.

23. The method of claim 19, wherein the optical source is a seed laser or oscillator.

* * * * *